United States Patent
Peterson

(10) Patent No.: US 11,565,355 B2
(45) Date of Patent: Jan. 31, 2023

(54) POPPET VALVE DEVICE, CANISTER VENT SOLENOID AND METHOD FOR IMPROVING A POPPET VALVE SEALING EFFICIENCY

(71) Applicant: ETO MAGNETIC GmbH, Stockach (DE)

(72) Inventor: Matthew Peterson, Grand Rapids, MI (US)

(73) Assignee: ETO MAGNETIC GmbH, Stockach (DE)

( * ) Notice: Subject to any disclaimer, the term of this patent is extended or adjusted under 35 U.S.C. 154(b) by 0 days.

(21) Appl. No.: 17/229,003

(22) Filed: Apr. 13, 2021

(65) Prior Publication Data
US 2022/0324068 A1   Oct. 13, 2022

(51) Int. Cl.
F16K 31/06   (2006.01)
B23P 15/00   (2006.01)
B65D 47/24   (2006.01)

(52) U.S. Cl.
CPC .......... B23P 15/002 (2013.01); B65D 47/24 (2013.01)

(58) Field of Classification Search
CPC ............ F16K 31/0668; F16K 31/082; F16K 31/0675; F16K 31/0655; F16K 31/06; B23P 15/002; B65D 47/24
USPC .................... 251/129.15, 86, 129.08, 129.19
See application file for complete search history.

(56) References Cited

U.S. PATENT DOCUMENTS

| | | | | |
|---|---|---|---|---|
| 2,829,861 A * | 4/1958 | Wright | ............... | F16K 31/0655 251/129.03 |
| 4,475,711 A * | 10/1984 | Rountry | ................... | F16K 1/36 251/86 |
| 4,522,372 A * | 6/1985 | Yano | .................... | F16K 31/0675 335/264 |
| 4,647,011 A * | 3/1987 | Contzen | ............. | F16K 31/0655 251/86 |
| 4,790,346 A * | 12/1988 | Kolze | ................ | F16K 31/0655 251/88 |
| 5,915,669 A * | 6/1999 | Zabeck | ............... | F16K 31/0655 251/129.02 |
| 6,047,947 A * | 4/2000 | Kumar | ............... | F16K 31/0655 335/279 |
| 6,273,396 B1 * | 8/2001 | Kato | .................. | F16K 31/0655 267/180 |
| 6,929,240 B2 * | 8/2005 | Ueda | ........................ | F16K 7/20 251/359 |
| 8,814,131 B2 * | 8/2014 | Lee | ........................ | F23N 1/005 251/86 |
| 10,571,029 B2 * | 2/2020 | Kajio | ................ | H01M 8/04089 |
| 10,626,996 B2 * | 4/2020 | Voss | .......................... | F16F 9/34 |
| 2002/0000530 A1 * | 1/2002 | Kumar | ................ | F16K 31/0655 251/129.17 |
| 2006/0138372 A1 * | 6/2006 | Haedicke | .............. | F16K 31/082 251/129.15 |
| 2012/0090177 A1 * | 4/2012 | Andueza | ............... | F16K 27/029 29/890.124 |

(Continued)

*Primary Examiner* — Charles P. Cheyney
(74) *Attorney, Agent, or Firm* — Posz Law Group, PLC

(57) ABSTRACT

A poppet valve device is proposed, comprising a valve stem, a poppet, having a sealing surface and being formed separately from the valve stem, wherein the poppet is actuatable via the valve stem, and wherein, following an imaginary line parallel to a longitudinal direction of the valve stem along the closing direction of the poppet, the sealing surface is passed before a front end of the valve stem is passed.

21 Claims, 2 Drawing Sheets

(56) References Cited

U.S. PATENT DOCUMENTS

Figure 1A:
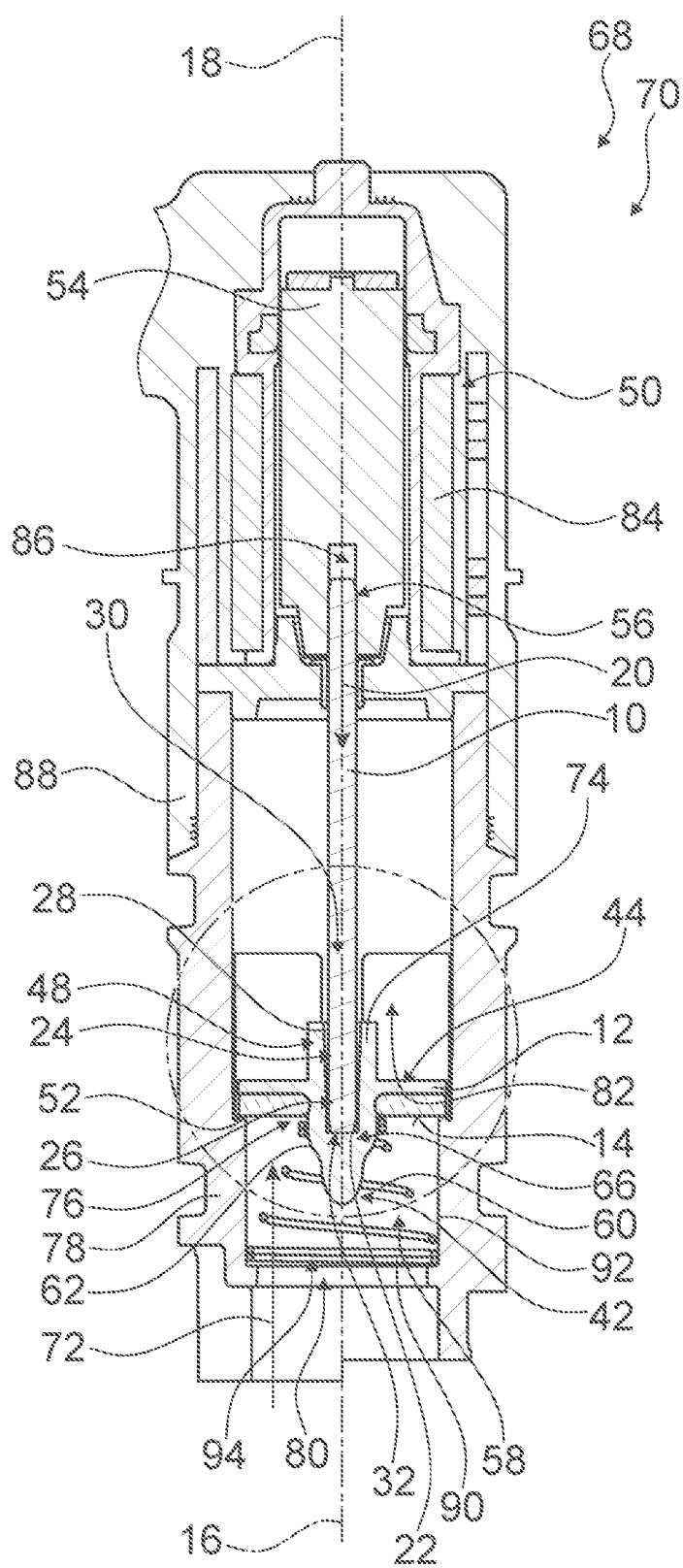

| | | | | |
|---|---|---|---|---|
| 2013/0133628 A1* | 5/2013 | Fornara | .................. | F02M 25/08 |
| | | | | 123/516 |
| 2016/0222924 A1* | 8/2016 | Dudar | .............. | B60K 15/03519 |
| 2020/0362982 A1* | 11/2020 | Kon | .......................... | F16K 1/42 |

* cited by examiner

POPPET VALVE DEVICE, CANISTER VENT SOLENOID AND METHOD FOR IMPROVING A POPPET VALVE SEALING EFFICIENCY

STATE OF THE ART

The invention relates to a poppet valve device, to a canister vent solenoid and/or a canister purge solenoid and to a method for improving a poppet valve sealing efficiency.

From the state of the art, various types of poppet valve designs are known. Often, these poppet valves have to be aligned and guided very precisely in order to achieve a sufficient sealing efficiency. This particularly is the case if, unlike in many poppet valves of internal combustion engines, the sealing surface of the poppet is on a frontal side of the poppet.

The objective of the invention is in particular to provide a method with advantageous characteristics regarding a valve leak tightness. The objective is achieved, according to the invention, by the features of the independent patent claims while advantageous implementations and further developments of the invention may be gathered from the subordinate claims.

Advantages of the Invention

The invention pertains to a poppet valve device comprising a valve stem, a poppet, having a sealing surface and being formed separately from the valve stem, wherein the poppet is, preferably linearly, actuatable via the valve stem.

It is proposed that following an imaginary line parallel to a longitudinal direction of the valve stem along the closing direction of the poppet, the sealing surface is passed before a front end of the valve stem is passed. By this design, advantageous characteristics regarding a valve leak tightness can be achieved. Advantageously, an especially tight and/or secure fit of the poppet valve's sealing surface on a valve seat of the poppet valve can be guaranteed. The invention advantageously provides an improved valve seal stability.

A "poppet valve device" is, in particular, to be understood as a valve or a component of a valve with a plate-shaped or disc-shaped valve plug, i.e. the poppet, which is actuated via a rod, i.e. the valve stem. Preferably, the poppet valve forms a part of a canister vent solenoid system, for example a canister vent valve of the canister vent solenoid system. However, alternative applications within alternative devices or systems are conceivable. Preferably, the poppet is moved in a linear fashion within a valve guide, which could be a pipe, a container or the like. Typically, the poppet has a round or oval disc-shape, however alternative disc-shapes, like polygonal disc-shapes or concave disc-shapes are conceivable. Preferably, the poppet is arranged close to an end region of the valve stem. The valve stem is preferably implemented as a straight rod, which in particular has a round or oval or differently shaped cross section. In particular, the valve stem is actuated directly or indirectly by an electromagnet/by a magnetic actuator system. The valve stem in particular carries and/or actuates the poppet. The poppet comprises a sealing surface, which is configured to provide the sealing function of the poppet valve, when interacting with the valve seat. The sealing surface is, in particular, located at a frontal end of the poppet. The sealing surface preferably faces away from the valve stem and or the electromagnet/the magnetic actuator system. The sealing surface, in particular, faces towards a direction, which is at least substantially parallel to a longitudinal extension/direction of the valve stem. Preferably, the sealing surface at least in an unloaded state is located on a surface of the poppet, which is arranged at least substantially perpendicularly relative to the longitudinal extension/direction of the valve stem.

By the poppet and the valve stem being formed separately from each other it is in particular to be understood that the valve stem and the poppet each are separate entities and/or components, which for example merely act on each other but are not necessarily substance-bound with each other. The valve stem is preferably configured to push the poppet towards the valve seat or away from the valve seat. In addition, it is also conceivable that the valve stem to some extent is also capable of pulling the poppet, however this function is only secondary or optional. The longitudinal direction of the valve stem in particular extends at least substantially parallel to a central longitudinal axis of the valve stem and/or parallel to a main direction of extension of the valve stem. A "main direction of extension" of an object shall in particular be understood as a direction parallel to a longest edge of a smallest geometric box, which just completely encloses the object. The longitudinal direction of the valve stem in particular extends at least substantially perpendicular to a main extension plane of the poppet and/or of the sealing surface. By a "main extension plane" of an object shall be understood in particular a plane which is parallel to a largest side surface of a smallest imaginary cuboid which just completely encloses the construction unit, and in particular runs through the center of the cuboid. The closing direction of the poppet preferably is the direction in which the poppet moves, when it transitions from an "open" state of the valve to a "closed" state of the valve. Mostly, the closing direction points away from the electromagnet/the magnetic actuator system of the poppet valve, however it is also conceivable that the closing direction points towards the electromagnet. The tip of the valve stem in the closing direction is further away from the electromagnet/the magnetic actuator system than the sealing surface. When the poppet moves along the closing direction, the sealing surface of the poppet moves towards a valve seat. In many configurations of the poppet valve device, in the "open" configuration of the poppet valve, the front end of the valve stem is closer to the valve seat than the sealing surface. The front end of the valve stem is in particular the end of the valve stem which points away from the electromagnet/the magnetic actuator system. Preferably, the front end of the valve stem contacts the poppet below the sealing surface when viewed along the closing direction. Preferably, a pushing point of the valve stem is below the sealing surface when viewed along the closing direction. In particular, the term "configured" shall be understood to mean specially programmed, designed and/or equipped. By "configured" it is to be understood in particular that an object is intended for a certain function, that the object fulfills and/or executes this certain function in at least one application and/or operating state.

Furthermore, it is proposed that the poppet is tiltable relative to the valve stem, in particular by at least up to 5°, preferably in any tilt direction, and/or that the valve stem is tiltable relative to the poppet, in particular by at least up to 5°, preferably in any tilt direction. By this design, advantageous characteristics regarding a valve leak tightness can be achieved. In particular, this design advantageously allows for an increased amount of perpendicularity tolerance and/or positional tolerance while still providing a tight and secure valve seal. The tiltability between valve stem and poppet advantageously can compensate for some amount of misalignment. Preferably, at least the poppet is tiltable relative to an at least substantially fixed orientation of the valve stem. Additionally or alternatively, also the valve stem possesses some degree of tiltability with regard to the poppet. Preferably, a tilt that is allowed between valve stem and poppet covers at least an angle range of at least 0° to 7°, more preferably of at least 0° to 5° and advantageously of at least 0° to 3°, preferably in all possible tilt directions. Preferably, the poppet valve provides a tight and secure valve seal at least up to tilt angles between the valve stem and the poppet of 7°, more preferably at least up to tilt angles of 5° and advantageously at least up to tilt angles of 3°.

In addition, it is proposed that the poppet provides a receptacle recess for an insertion of an end section of the valve stem. By this an advantageous force transfer from the valve stem to the poppet can be advantageously achieved. Furthermore, an advantageous direction of the force transfer from the valve stem to the poppet can be advantageously achieved. The receptacle recess is configured to receive the front end of the valve stem. The front end of the valve stem preferably touches the bottom of the receptacle recess. The front end of the valve stem preferably pushes against the bottom of the receptacle recess when actuating the poppet along the closing direction. The receptacle recess preferably encompasses the end section of the valve stem completely in its circumference. The receptacle recess in particular receives at least 5%, preferably at least 10%, more preferably at least 15% and advantageously at least 20% of the entire length of the valve stem. The receptacle recess in particular receives at most 40%, preferably at most 35%, more preferably at most 30% and advantageously at most 25% of the entire length of the valve stem. The receptacle recess is arranged at least substantially central within the poppet.

When the valve stem and the poppet are connected via a clearance fit, an advantageous degree of tiltability between the valve stem and the poppet can be assured during the operation of the poppet valve, which in turn can lead to an improved tightness of the valve seal. In particular, the tiltability tolerance allows for a reduction on production costs f parts costs due to a lower manufacturing precision necessary. The receptacle recess preferably comprises an inner diameter that is at least section-wise larger than the outer diameter of the part of the valve stem that is to be inserted into the receptacle recess. In particular, the clearance fit is at least a "loose running" clearance fit, a "free running" clearance fit or a "close running" clearance fit (according to the corresponding ISO definitions, like for example DIN EN ISO 286-1:2019).

When in addition a clearance between the valve stem and inner walls of the receptacle recess of the poppet is larger at an opening of the receptacle recess than at a bottom of the receptacle recess, an advantageous relation between a tiltability and a good fit of the valve stem within the poppet can be achieved. A difference between an inner diameter of the receptacle and an outer diameter of the valve stem is preferably larger at an opening of the receptacle recess than at the bottom of the receptacle recess. To achieve this preferably the inner diameter of the receptacle recess increases from the bottom towards the opening. Alternatively or additionally, the outer diameter of the valve stem could decrease from the bottom towards the opening. In particular, the inner diameter of the receptacle recess at the opening is at least 5%, preferably at least 10% larger than the inner diameter of the receptacle recess at bottom. In particular, the inner diameter of the receptacle recess is larger than the outer diameter of the valve stem over the whole receptacle recess. Alternatively, it is conceivable that towards the bottom of the receptacle recess the inner diameter of the receptacle recess and the outer diameter of the valve stem become about equal. In particular, the clearance between the valve stem and the receptacle recess increases gradually and preferably continuously from the bottom of the receptacle recess towards the opening of the receptacle recess. Alternatively, a step-wise increase of clearance is also conceivable.

When in this case the inner diameter of the receptacle is larger at the opening of the receptacle recess than at the bottom of the receptacle recess, an advantageous relative tiltability between the poppet and the valve stem can be achieved. Furthermore, by selecting the diameter increase, a maximum possible tilt angle can advantageously to some degree be set. Advantageously, the inner walls of the receptacle recess are angled towards the vertical axis by at least 1.5°, preferably by at least 2°, more preferably by at least 2.5° and especially preferred by at most 3.5°.

Additionally, it is proposed that a distance between the sealing surface of the poppet and the front end of the valve stem measured parallel to the closing direction is greater than 30%, preferably greater than 40% and more preferably greater than 45% of a maximum diameter of the valve stem. Thereby, an especially good stability of the poppet valve and/or a particularly tight valve seat can be advantageously achieved. The maximum diameter of the valve stem is preferably measured in a connection region between poppet and valve stem.

Moreover, it is proposed that a distance between the sealing surface of the poppet and the front end of the valve stem measured parallel to the closing direction is at least 5% of a sealing diameter of the sealing surface, in particular at least 7.5% of the sealing diameter of the sealing surface. Thereby, an especially good stability of the poppet valve and/or a particularly tight valve seat can be advantageously achieved. The "sealing diameter of the sealing surface" in particular is to be understood as a minimal diameter of the part of the sealing surface which contacts the valve seat when the poppet valve is closed.

Advantageously, it is proposed that the receptacle recess fully envelops the end section of the valve stem. Thereby, an angular symmetry of the tiltability can advantageously be achieved. The receptacle recess in particular covers the circumference and the tip/the front end of the valve stem. The tip/the front end of the valve stem does not protrude from the poppet at a side that is facing away from the electromagnet/magnetic actuator system. The poppet embodies an end cap, in particular a closed end cap for the valve stem.

Moreover, it is proposed that the receptacle recess of the poppet forms a dome-shape protruding from a disc-like region of the poppet in the closing direction. By this, advantageous characteristics regarding stability and durability can be achieved. The dome-shape preferably protrudes from the poppet in a direction, which is perpendicularly arranged to the sealing surface. The dome-shape preferably protrudes from the poppet in a direction, which represents a straight prolongation of the valve stem. The dome-shape preferably is smaller in diameter than an outer diameter of the envelope that forms the receptacle recess.

Besides, it is proposed that the receptacle recess comprises a maximum wall thickness in a direction parallel to the closing direction. Thereby, a high stability and durability can advantageously be achieved, in particular since the wall, which experiences the largest fraction of the force exerted by the electromagnet provides the greatest wall thickness. In particular, the wall thickness of the receptacle recess in the closing direction is substantially larger (at least twice as large) than the average wall thickness of the receptacle recess in a direction perpendicular to the closing direction.

Furthermore, it is proposed that the receptacle recess of the poppet forms a tube-shape protruding from a disc-like region of the poppet in a direction opposite to the closing direction. Thereby an advantageous guiding of the valve stem and its allowable movement relative to the poppet can be achieved. Preferably, at least most of the part of the poppet that forms a receptacle recess for an insertion of an end section of the valve stem is made from a material with a considerably higher elasticity and/or a considerably higher flexibility than the one of the valve stem. Preferably, the valve stem is made of a metal and at least most of the poppet is made of a plastic. Although alternatively the valve stem could also be made out of plastic or the poppet could also be made out of metal, even the opposite to the above (poppet=metal; valve stem=plastic) is conceivable.

In addition, it is proposed that the poppet valve device comprises the magnetic actuator system to generate the movement of the valve stem along and/or against the closing direction. From this, advantageous characteristics regarding the controllability of the poppet valve can be achieved. The magnetic actuator system comprises a magnetic coil and a magnetic anchor, which is actuated by changes of the magnetic field that can be produced by the magnetic coil. The magnetic actuator system is well known from the state of the art and will not be described more in detail herein.

It is further proposed that, when energized, the magnetic actuator system creates a force, in particular a closing force or an opening force, that pushes the valve stem towards the poppet, which in turn is pushed towards the valve seat or away from the valve seat and thus presses the sealing surface onto the valve seat or removes the sealing surface from the valve seat. Thereby a poppet valve with a closing mechanism and direction which is advantageous for numerous applications and which in particular is considerably different from the operating principles of most internal combustion engine poppet valves can be achieved. In particular, the closing force pushes the poppet towards the closing direction. In particular, the average force direction of the magnetic actuator systems is parallel to the closing direction and/or to the longitudinal direction of the valve stem.

It is also proposed that the magnetic actuator system comprises the magnetic anchor, which is connected to a rear end of the valve stem. From this, advantageous characteristics regarding the controllability of the poppet valve can be achieved. The rear end of the valve stem is located opposite to the front end of the valve stem in the longitudinal direction of the valve stem. The valve stem preferably is at least frictionally bound to the magnetic anchor. Alternatively or additionally, the valve stem can be connected to the magnetic anchor by a force-fite- and/or by a form-fit-connection. The magnetic anchor preferably is made predominantly from a magnetic, in particular ferromagnetic material, for example magnetic steel or iron. The valve stem is preferably made form an at least substantially non-magnetic material, for example aluminum.

Furthermore, it is proposed that the poppet valve device comprises a reset unit which is configured to reset the poppet into an initial position, in particular in a de-energized state of the magnetic actuator. Thereby advantageous valve characteristics can be achieved. Furthermore, this advantageously enables a clearance fit between valve stem and poppet. The reset unit is preferably embodied as a mechanical reset unit, like a spring, for example a compression spring. The reset unit is in particular arranged opposite the valve stem in relation to the poppet. Preferably, the reset unit is in a maximally compressed state when the valve stem is forcibly actuated by the magnetic actuator system. Preferably, the reset unit is in a maximally relaxed state when the magnetic field of the magnetic coil of the magnetic actuator system is deactivated.

Moreover, it is proposed that the poppet valve device is a normally-open poppet valve or a normally-closed poppet valve, with the normally-open poppet valve in particular being the more useful configuration for a canister vent solenoid. Thereby advantageous operating characteristics, in particular depending on the respective application field, can be achieved.

If the reset unit is embodied as a reset spring that is supported at the poppet, a particularly simple and cost effective normally-open or normally-closed poppet valve can be achieved. In particular, the reset spring is supported at the poppet on the side of the poppet, which also comprises the sealing surface. Preferably, the sealing surface at least substantially surrounds and/or encircles a spring valve support region at the poppet.

Besides it is proposed that the poppet provides a receptacle recess for an insertion of an end section of the valve stem and wherein at least a part of the reset spring encircles an outer side of the receptacle recess and in particular encircles an end section of the valve stem. Thereby, a particularly advantageous intrinsic stability of the poppet valve can be achieved. In particular, the reset spring surrounds and/or encircles the dome-shape that is protruding from the disc-like region of the poppet in the closing direction. In particular, at least two 360° windings of the reset spring wind around the dome-shape that is protruding from the disc-like region of the poppet in the closing direction. In particular, a diameter of the reset spring increases with distance from the poppet in the closing direction. An opposite end of the reset spring is preferably supported at inner walls of a poppet valve housing. The reset spring preferably is embodied as a cone shaped spring which cone top is directed towards the poppet of the poppet valve.

Moreover, it is proposed that an outer spring diameter of the reset spring at an end of the reset spring that faces towards the poppet, in particular at a cone top of the conical reset spring, corresponds to at least one fourth of the sealing diameter of the sealing surface, preferably at least one third of the sealing diameter of the sealing surface and more preferably at least 40% of the sealing diameter of the sealing surface. In particular, the outer spring diameter of the reset spring at an end of the reset spring that faces towards the poppet corresponds to at most 50% of the sealing diameter of the sealing surface, preferably at most 45% of the sealing diameter of the sealing surface and most preferably at most 40% of the sealing diameter of the sealing surface. Thereby, an especially good stability of the poppet valve and/or a particularly tight valve seat can be advantageously achieved. The "outer spring diameter" is preferably measured at opposing outermost side of the circumference of the spring wire, when the spring is viewed from the top along its spring axis.

It is additionally proposed that the reset unit is configured to retain a relative longitudinal position of the valve stem to the poppet, in particular also in an "open" state of the poppet valve. Thereby, a stable, reliable and functional but still flexibly tiltable design of the poppet, in particular of the poppet valve, can be achieved. The reset spring pushes the poppet towards the front end of the valve stem. The reset spring preferably ensures that the valve stem always remains within the receptacle recess. The reset spring in particular ensures that the front end of the valve stem always remains in contact within the bottom of the receptacle recess.

Furthermore, a canister vent solenoid and/or a canister purge solenoid with a poppet valve device is proposed. In addition, it is proposed that within this canister vent solenoid and/or a canister purge solenoid the poppet valve device is applied to controllably block or unblock a flow path between a filter medium and a charcoal canister. Thereby an effective control over the canister vent solenoid and/or a canister purge solenoid with a highly reliable valve performance and valve tightness can be achieved. A canister vent solenoid is a part of an evaporation emission control (EVAP) system, which main purpose it is to prevent environmentally harmful leaks of fuel systems by hindering gasoline vapors from escaping the fuel system and entering the atmosphere. Thereby the canister vent solenoid controls the opening and closing of the fuel vapor lines to the charcoal canister.

In addition, a further poppet valve device comprising a valve stem, a poppet, having a sealing surface and being formed separately from the valve stem, wherein the poppet is actuatable via the valve stem, and wherein the valve stem is tiltably connected to the poppet via a clearance fit, is proposed. Thereby an advantageous degree of tiltability between the valve stem and the poppet can be assured during the operation of the poppet valve, which in turn can lead to an improved tightness of the valve seal. In this context it is again proposed that the poppet valve device comprises a reset unit, which is configured to retain a relative longitudinal position of the valve stem to the poppet in any regular actuation state.

Thereby, a stable, reliable and functional but still flexibly tiltable design of the poppet, in particular of the poppet valve, can be achieved.

Moreover, a method for improving a poppet valve sealing efficiency, wherein a poppet is connected with a separately formed valve stem in a way that a limited angular movement of the valve stem relative to a sealing surface of the poppet is permitted is proposed. Thereby an advantageous degree of tiltability between the valve stem and the poppet can be assured during the operation of the poppet valve, which in turn can lead to an improved tightness of the valve seal.

The poppet valve device according to the invention, the canister vent solenoid and/or canister purge solenoid according to the invention and the method for improving a poppet valve sealing efficiency according to the invention are herein not to be restricted to the applications and implementation forms described above or pictured below. In particular, to fulfill a functionality herein described, the poppet valve device according to the invention, the canister vent solenoid and/or canister purge solenoid according to the invention and the method for improving a poppet valve sealing efficiency according to the invention may comprise a number of respective elements and/or structural components and/or units and/or method steps that differ/s from a number herein mentioned. The features that are described in the dependent claims are combinable at will, as long as this does not result in any contradictions.

DRAWINGS

Further advantages will become apparent from the following description of the drawings. In the drawings, one exemplary embodiment of the invention is depicted. The drawings, the description and the claims contain a plurality of features in combination. Someone skilled in the art will purposefully also consider the features separately and will find further expedient combinations.

Figure 1B:
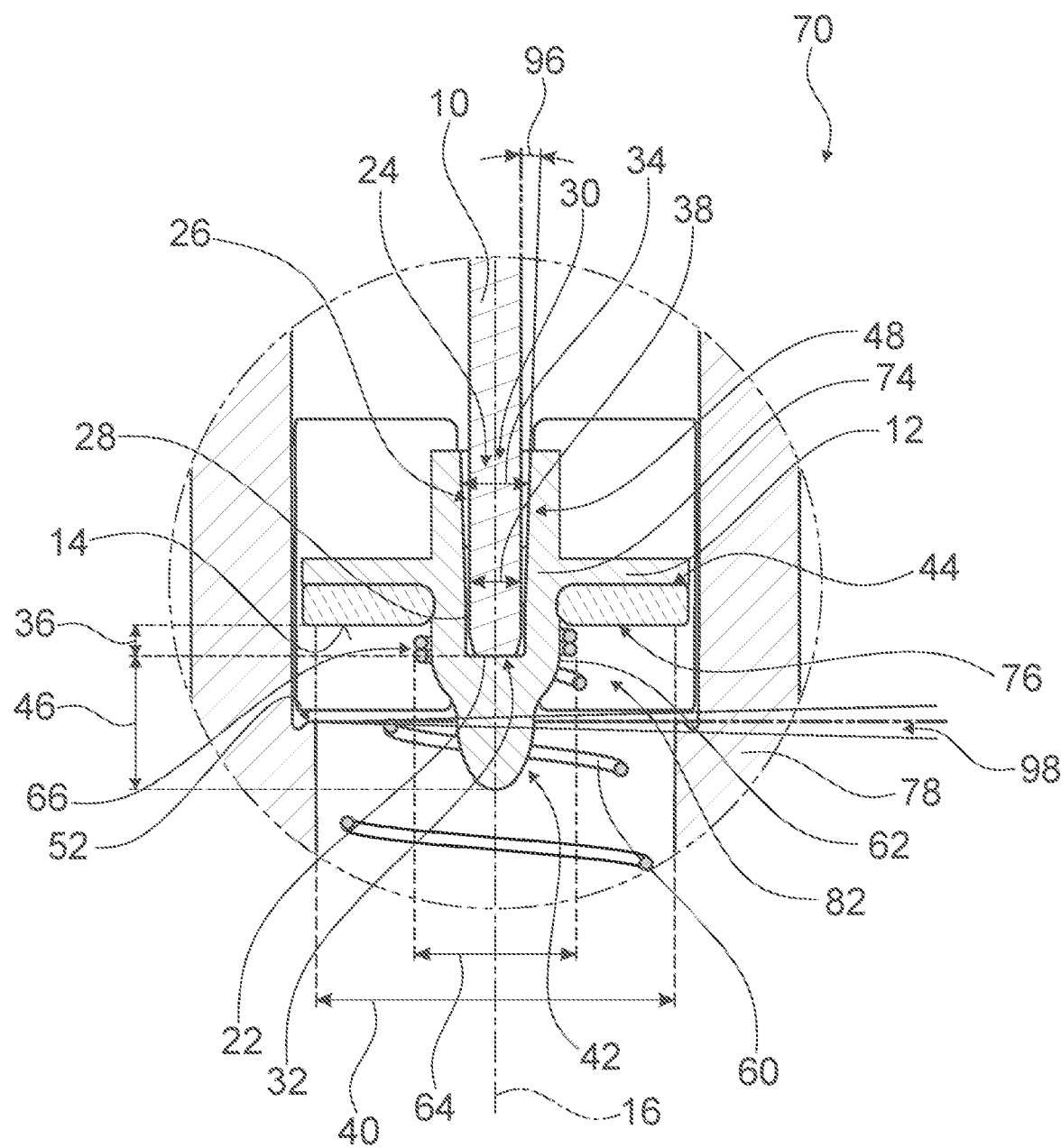
Figure 2:
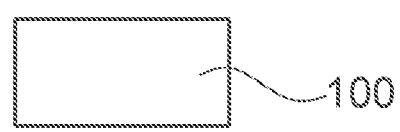

It is shown in:

FIG. 1a a schematical sectional view of a poppet valve device of a canister vent solenoid and/or a canister purge solenoid, FIG. 1b an enlarged view of part of the sectional view of the poppet valve device and FIG. 2 a schematical flowchart of a method for improving a poppet valve sealing efficiency.

DESCRIPTION OF THE EXEMPLARY EMBODIMENT

The FIG. 1a schematically shows a sectional view of a (closed) poppet valve device 70. To ease an understanding of FIG. 1a, the components of the poppet valve device 70 are largely shown as being rotationally symmetric. It goes without saying that one or more components could also deviate from the rotation symmetry without compromising the invention. The poppet valve device 70 forms part of a canister vent solenoid and/or a canister purge solenoid 68. The poppet valve device 70 is applied within the canister vent solenoid and/or within the canister purge solenoid 68 for controllably blocking or unblocking a flow path 72 between a filter medium and a charcoal canister (both not shown in the Figures). The poppet valve device 70 of FIG. 1a is normally-open.

The poppet valve device 70 comprises a valve stem 10. The valve stem 10 is embodied as a metal rod. The valve stem 70 has a longitudinal extension. The valve stem 70 extends predominantly along a longitudinal direction 18. The poppet valve device 70 comprises a poppet 12. The poppet 12 is formed separately from the valve stem 10. The valve stem 10 and the poppet 12 are free from form-fit or substance-bounds with each other. However, alternatively partial form-fit-connections or partial substance-bound-connections between valve stem 10 and poppet 12 may be considered. The poppet 12 is actuatable via the valve stem 10.

The poppet 12 follows any movements of the valve stem 10 at least along the longitudinal direction 18.

The poppet 12 has a partially disc-like shape. The poppet 12 comprises a disc-like region 44. The poppet valve device 70 comprises a valve seat 52. The poppet valve device 70 comprises a lower housing 78. The valve seat 52 is formed integrally with the lower housing 78 in the example shown in FIG. 1a. The lower housing 78 forms the boundaries of the flow path 72 within the poppet valve device 70. The lower housing 78 comprises an inlet 80 and an outlet 82 of the flow path 72. In the configuration of FIG. 1a the poppet valve device 70 is shown in an "closed" configuration, wherein the flow path 72 between the inlet 80 and the outlet 82 is blocked. The poppet 12 is configured to close the flow path 72 by sitting tightly onto the valve seat 52. The poppet 12 has a sealing surface 14. The sealing surface 14 is configured to contact the valve seat 52 in order to achieve a tight fit on the valve seat 52. The contact face of the sealing surface 14 has a sealing diameter 40, which basically corresponds to the diameter of the valve seat 52. In the exemplary depiction of FIG. 1a, a main body 74 of the poppet 12 and a region 76 of the poppet 12 which comprises the sealing surface 14 are made from two different materials. For example, the main body 74 is made of metal or a hard plastic while the region 76 with the sealing surface 14 is made of a flexible rubber. Alternatively, the poppet 12 could be made from a single piece. When the valve stem 10 is actuated towards a closing direction 20 of the poppet 12, the poppet 12 moves towards the valve seat 52. When the poppet 12 sits tightly on the valve seat 52, the flow path 72 between the inlet 80 and the outlet 82 is blocked. When the valve stem 10 is actuated against the closing direction 20 of the poppet 12, the poppet 12 moves away from the valve seat 52.

Following an imaginary line 16 parallel to the longitudinal direction 18 of the valve stem 10 along the closing direction 20 of the poppet 12, the arrangement of the sealing surface 14 of the poppet 12 and a front end 22 of the valve stem within the ready-for-use poppet valve device 70 is as follows: first the sealing surface 14 is passed and then the front end 22 of the valve stem 10 is passed. When viewed along the closing direction 20, then any imaginary plane that extends perpendicularly relative to the closing direction 20 and/or relative to the longitudinal direction 18 of the valve stem 10 and that contacts the front end 22 of the valve stem 10 lies behind/deeper than any further imaginary plane that extends perpendicularly relative to the closing direction 20 and/or relative to the longitudinal direction 18 of the valve stem 10 and that contacts the sealing surface 14.

The poppet valve device 70 comprises a magnetic actuator system 50. The exemplary magnetic actuator system 50 of FIG. 1a is configured to generate a movement of the valve stem 10 along the closing direction 20. When energized, the magnetic actuator system 50 creates a force that pushes the valve stem 10 towards the poppet 12, which in turn is pushed towards the valve seat 52 and thus presses the sealing surface 14 onto the valve seat 52. The magnetic actuator system 50 comprises a magnetic coil 84. The magnetic coil 84 is configured to produce a magnetic field. The magnetic actuator system 50 comprises a magnetic anchor 54. The magnetic anchor 54 is movably supported. The magnetic anchor 54 is largely located within the magnetic coil 84. The magnetic anchor 54 reacts to the magnetic field of the magnetic coil 84. When the magnetic field of the magnetic coil 84 of FIG. 1a is activated, the magnetic anchor 54 is pulled more into the center of the magnetic coil 84 due to a reluctance force. The magnetic anchor 54 is connected to a rear end 56 of the valve stem 10. The valve stem 10 is inserted in a receptacle recess 86 of the magnetic anchor 54. The valve stem 10 is at least frictionally bound to the magnetic anchor 54. The valve stem 10 follows the movements of the magnetic anchor 54. The poppet valve device 70 comprises an upper housing 88. The upper housing 88 encompasses the magnetic actuator system 50. The lower housing 78 and the upper housing 88 are tightly connected to each other in a region below the magnetic coil 84 and above the topmost position of the poppet 12. The front end 22 of the valve stem 10 is further away from the magnetic anchor 54 and/or from the magnetic coil 84 than the sealing surface 14 of the poppet 12.

The poppet valve device 70 comprises a reset unit 58 for resetting the poppet 12 to an initial position after the force that is created by the magnetic actuator system 50 is turned off. The reset unit 58 retains a relative longitudinal position of the valve stem 10 to the poppet 12. The reset unit 58 is configured to retain a relative longitudinal position of the valve stem 10 to the poppet 12 in any regular actuation state of the poppet valve device 70. The reset unit 58 is embodied as a reset spring 60. The reset spring 60 is embodied as a compression spring/spiral spring. The reset spring 60 has a conical shape, with the top (smaller) end 66 of the cone being directed towards the magnetic actuator system 50/the poppet 12. The reset spring 60 is supported at the poppet 12 with one of its ends 66. The reset spring 60 is supported on a ledge 90 at an inner wall 92 of the lower housing 78 with its other end 94. In the configuration of FIG. 1a, the magnetic coil 84 is activated and the poppet 12 is pressed onto the valve seat 52 and the reset spring 60 is tensioned.

The FIG. 1b schematically shows an enlarged view of the parts of the poppet valve device 70 surrounding the poppet 12, wherein the poppet valve device 70 is in a partially "open" configuration. The poppet 12 is tiltable relative to the valve stem 10. An exemplary maximum tilt angle 96 as it is shown in FIG. 1b is about 3.5°. This allows for some tolerance of perpendicularity of the seat of the poppet 12 on the valve seat 52 (as is illustrated by a range 98 in FIG. 1b). The poppet 12 provides a receptacle recess 24 for an insertion of an end section 26 of the valve stem 10. The receptacle recess 24 fully envelops the end section 26 of the valve stem 10 in the ready-for-use configuration of the poppet valve device 70. The valve stem 10 is inserted into the receptacle recess 24 with a clearance fit. The valve stem 10 and the poppet 12 are connected via a clearance fit. The valve stem 10 and the poppet 12 are tiltably connected relative to each other. The clearance between the valve stem 10 and inner walls 28 of the receptacle recess 24 of the poppet 12 is larger at an opening 30 of the receptacle recess 24 than at a bottom 32 of the receptacle recess 24. An inner diameter 34 of the receptacle recess 24 is larger at an opening 30 of the receptacle recess 24 than at a bottom 32 of the receptacle recess 24. The inner diameter 34 of the receptacle recess 24 increases continuously from the bottom 32 to the top opening of the receptacle recess 24. The receptacle recess 24 is shaped like a tube that is closed at one end. The bottom 32 of the receptacle recess 24 is completely closed by lower side walls.

The front end 22 of the valve stem 10 touches the lower side walls of the receptacle recess 24 at the bottom 32 of the receptacle recess 24. During a closing process, the valve stem 10 pushes against the lower side walls of the receptacle recess 24 at the bottom 32 of the receptacle recess 24. The receptacle recess 24 of the poppet 12 forms a dome-shape 42. The dome-shape 42 protrudes from the disc-like region 44 of the poppet 12 in the closing direction 20. The receptacle recess 24 comprises its maximum wall thickness 46 in a direction parallel to the closing direction 20. The dome-shape 42 provides the maximum wall thickness 46. Opposite the dome-shape 42, the receptacle recess 24 of the poppet 12 forms a tube-shape 48. The tube-shape 48 protrudes from the disc-like region 44 of the poppet 12 in a direction opposite to the closing direction 20. The tube-shape 48 is intended to envelop the valve stem 10. The tube-shape 48 provides support for the valve stem 10 and limits the size maximum tilt angle 96. If the valve stem 24 was pulled in a direction that points against the closing direction 20 without the presence of the reset spring 60, the valve stem 24 would be pulled out of the receptacle recess 24 effortlessly.

At least a part of the reset spring 60 encircles an outer side 62 of the receptacle recess 60. The part of the rest spring 60 that encircles the outer side 62 of the receptacle recess 24 also encircles the end section 26 of the valve stem 10. In the example of FIGS. 1a and 1b, an outer spring diameter 64 of the reset spring 60 at the end 66 of the reset spring 60 that faces towards the poppet 12 corresponds to about 45% of the sealing diameter 40 of the sealing surface 14. In general, the outer spring diameter 64 corresponds to at least 25% of the sealing diameter 40 of the sealing surface 14 in order to provide a sufficient stability.

In the example of FIGS. 1a and 1b, a distance 36 between the sealing surface 14 of the poppet 12 and the front end 22 of the valve stem 10 measured parallel to the closing direction 20 is greater than 50% of a maximum diameter 38 of the valve stem 10. In general, the distance 36 between the sealing surface 14 and the front end 22 is greater than 30% of a maximum diameter 38 of the valve stem 10. In the example of FIGS. 1a and 1b, the distance 36 between the sealing surface 14 of the poppet 12 and the front end 22 of the valve stem 10 measured parallel to the closing direction 20 is greater than 7.5% of a sealing diameter 40 of the sealing surface 14. In general, the distance 36 between the sealing surface 14 and the front end 22 is greater than 7.5% of the sealing diameter 40 of the sealing surface 14.

FIG. 2 shows a schematical flowchart of a method for improving a poppet valve sealing efficiency. In at least one method step 100 the poppet 12 is connected with the separately formed valve stem 10 in a way that a limited angular movement of the valve stem 10 relative to the sealing surface 24 of the poppet 12 is permitted. In order to achieve the tiltability the valve stem 10 in the method step 100 is inserted into the receptacle recess 24 of the poppet 12 via a clearance fit that allows the valve stem 10 to move within the receptacle recess 24. In order to avoid a falling off of the poppet 12 from the valve stem 10 during the method step 100 the poppet 12 is pushed towards the valve stem 12 by the rest spring 60 from below.

REFERENCE NUMBERS

10 Valve stem
12 Poppet
14 Sealing surface
16 Imaginary line
18 Longitudinal direction
20 Closing direction
22 Front end
24 Receptacle recess
26 End section
28 Inner wall
30 Opening
32 Bottom
34 Inner diameter
36 Distance
38 Maximum diameter
40 Sealing diameter
42 Dome-shape
44 Disc-like region
46 Maximum wall thickness
48 Tube-shape
50 Magnetic actuator system
52 Valve seat
54 Magnetic anchor
56 Rear end
58 Reset unit
60 Reset spring
62 Outer side
64 Outer Spring diameter
66 End
68 canister vent solenoid and/or canister purge solenoid
70 Poppet valve device
72 Flow path
74 Main body
76 Region
78 Lower housing
80 Inlet
82 Outlet
84 Magnetic coil
86 Receptacle recess
88 Upper housing
90 Ledge
92 Inner wall
94 End
96 Tilt angle
98 Range
100 Method step

The invention claimed is:

1. A poppet valve device comprising
a valve stem having a front end and a rear end,
a poppet, having a sealing surface and being formed separately from the valve stem, and
a reset unit for resetting the poppet into an initial position,
wherein the poppet provides a receptacle recess formed in a dome-shaped portion beyond the sealing surface in a closing direction,
wherein the poppet is actuatable via the valve stem,
wherein, following an imaginary line parallel to a longitudinal direction of the valve stem along a closing direction of the poppet, the sealing surface is passed before the front end of the valve stem is passed, such that the front end of the valve stem passes through the sealing surface and into the receptacle recess of the poppet;
wherein the sealing surface is on a side of the poppet facing away from the valve stem,
wherein the reset unit is embodied as a reset spring that is supported at the poppet,
wherein the reset spring is supported on the side of the poppet, which also comprises the sealing surface or the reset unit is arranged opposite the valve stem in relation to the poppet, and
wherein the receptacle recess of the poppet forms a tube-shape protruding from the sealing surface of the poppet in a direction opposite to the closing direction.

2. The poppet valve device according to claim 1, wherein the poppet is tiltable relative to the valve stem and/or wherein the valve stem is tiltable relative to the poppet.

3. The poppet valve device according to claim 1, wherein the valve stem and the poppet are connected via a clearance fit.

4. The poppet valve device according to claim 3, wherein a clearance between the valve stem and inner walls of the receptacle recess of the poppet is larger at an opening of the receptacle recess of the poppet than at a bottom of the receptacle recess of the poppet.

5. The poppet valve device according to claim 3, wherein an inner diameter of the receptacle recess of the poppet is larger at an opening of the receptacle recess of the poppet than at a bottom of the receptacle recess of the poppet.

6. The poppet valve device according to claim 1, wherein a distance between the sealing surface of the poppet and the front end of the valve stem measured parallel to the closing direction is greater than 30% of a maximum diameter of the valve stem.

7. The poppet valve device according to claim 1, wherein a distance between the sealing surface of the poppet and the front end of the valve stem measured parallel to the closing direction is greater than 5% of a sealing diameter of the sealing surface.

8. The poppet valve device according to claim 1, wherein the receptacle recess of the poppet fully envelops the front end of the valve stem.

9. The poppet valve device according to claim 1, wherein the sealing surface of the poppet forms a disc-like region from which the dome-shaped portion of the poppet protrudes in the closing direction.

10. The poppet valve device according to claim 9, wherein the receptacle recess of the poppet comprises a maximum wall thickness in a direction parallel to the closing direction.

11. The poppet valve device according to claim 1, comprising a magnetic actuator system to generate a movement of the valve stem along and/or against the closing direction.

12. The poppet valve device according to claim 11, wherein, when energized, the magnetic actuator system creates a force that pushes the valve stem towards the poppet, which in turn is pushed towards a valve seat or away from the valve seat and thus presses the sealing surface onto the valve seat or removes the sealing surface from the valve seat.

13. The poppet valve device according to claim 11, wherein the magnetic actuator system comprises a magnetic anchor, which is connected to the rear end of the valve stem.

14. The poppet valve device according to claim 1, being normally-open or normally-closed.

15. The poppet valve device according to claim 1, wherein at least a part of the reset spring encircles an outer side of the receptacle recess of the poppet.

16. The poppet valve device according to claim 1, wherein an outer spring diameter of the reset spring at an end of the reset spring that faces towards the poppet corresponds to at least one fourth of a sealing diameter of the sealing surface.

17. The poppet valve device according to claim 1, wherein the reset unit retains a relative longitudinal position of the valve stem to the poppet.

18. A canister vent solenoid and/or a canister purge solenoid with a poppet valve device according to claim 1.

19. The poppet valve device according to claim 15, wherein at least a part of the reset spring encircles the front end of the valve stem.

20. A poppet valve device comprising
a valve stem having a front end and a rear end,
a poppet, having a sealing surface and being formed separately from the valve stem, and
a reset unit for resetting the poppet into an initial position,
wherein the poppet is actuatable via the valve stem,
wherein, following an imaginary line parallel to a longitudinal direction of the valve stem along the closing direction of the poppet, the sealing surface is passed before the front end of the valve stem is passed, such that the front end of the valve stem passes through the sealing surface and into a dome-shaped portion of the poppet beyond the sealing surface in the closing direction,
wherein the poppet is tiltable relative to the valve stem and/or wherein the valve stem is tiltable relative to the poppet,
wherein the poppet provides a receptacle recess for an insertion of the front end of the valve stem,
wherein the receptacle recess of the poppet is disposed in the dome-shaped portion of the poppet,
wherein the dome-shaped portion protrudes from a disc-like region of the poppet in the closing direction, and
wherein in the closing direction the reset spring surrounds and/or encircles the dome-shape and the disc-like region of the poppet extends farther in a radial direction perpendicular to the longitudinal direction than the reset spring.

21. The poppet valve device according to claim 1, wherein the reset spring has a conical shape and contacts a portion of the poppet beyond the sealing surface in the closing direction.

* * * * *